United States Patent [19]

Shirakawa et al.

[11] Patent Number: 5,249,142

[45] Date of Patent: Sep. 28, 1993

[54] INDIRECT TEMPERATURE-MEASUREMENT OF FILMS FORMED ON SEMICONDUCTOR WAFERS

[75] Inventors: Eiichi Shirakawa; Masafumi Nomura; Kimiharu Matsumura, all of Kumamoto, Japan

[73] Assignees: Tokyo Electron Kyushu Limited, Kumamoto; Kokusai Gljutsu Kaihatsu Co., Ltd., Tokyo, both of Japan

[21] Appl. No.: 864,185

[22] Filed: Apr. 3, 1992

Related U.S. Application Data

[63] Continuation of Ser. No. 497.534, Mar. 22, 1990, abandoned.

[30] Foreign Application Priority Data

Mar. 31, 1989 [JP] Japan .................................. 1-81981

[51] Int. Cl.⁵ ................................................ G01J 5/00
[52] U.S. Cl. .................................... 364/557; 374/121; 374/132; 356/45; 250/339
[58] Field of Search ................ 364/557, 550, 571.03; 374/126, 127, 128, 192, 9, 120, 121, 132, 133; 250/338.3, 339, 345; 356/43, 45

[56] References Cited

U.S. PATENT DOCUMENTS

| | | | |
|---|---|---|---|
| 3,539,807 | 11/1970 | Bickel | 374/129 X |
| 4,300,392 | 11/1981 | Bloomer et al. | 374/172 X |
| 4,435,092 | 3/1984 | Iuchi | 374/129 |
| 4,465,382 | 8/1984 | Iuchi et al. | 374/9 |
| 4,480,930 | 11/1984 | DeZubay et al. | 364/557 X |
| 4,516,864 | 5/1985 | Kim et al. | 374/137 X |
| 4,611,930 | 9/1986 | Stein | 374/126 |
| 4,845,647 | 7/1989 | Dils et al. | 364/557 |
| 4,880,314 | 11/1989 | Kienitz | 374/129 |
| 4,881,823 | 11/1989 | Tanaka et al. | 374/126 |
| 4,919,542 | 4/1990 | Nulman et al. | 374/9 |
| 4,974,182 | 11/1990 | Tank | 364/557 |
| 4,979,133 | 12/1990 | Arima et al. | 364/557 |
| 4,979,134 | 12/1990 | Arima et al. | 364/557 |
| 4,980,847 | 12/1990 | Hirano | 364/557 |
| 5,021,980 | 6/1991 | Poenisch et al. | 364/557 |
| 5,029,117 | 7/1991 | Patton | 364/557 |

*Primary Examiner*—Jack B. Harvey
*Assistant Examiner*—Edward Pipala
*Attorney, Agent, or Firm*—Oblon, Spivak, McClelland, Maier & Neustadt

[57] ABSTRACT

A method of measuring the temperature of a matter accurately, in non-contact fashion and without setting any emissivity comprising obtaining a spectral characteristics of absorbing electromagnetic waves inherent to a matter whose temperature is to be measured, obtaining those absorption peak wavelengths of the electromagnetic waves which correspond to two or more high points of electromagnetic wave absorption rate obtained from the spectral characteristics, measuring amounts of the electromagnetic waves, which have the absorption peak wavelengths, radiated from the temperature-measured matter, and calculating the temperature of the matter from blues of the radiant amounts of the electromagnetic waves thus measured.

12 Claims, 3 Drawing Sheets

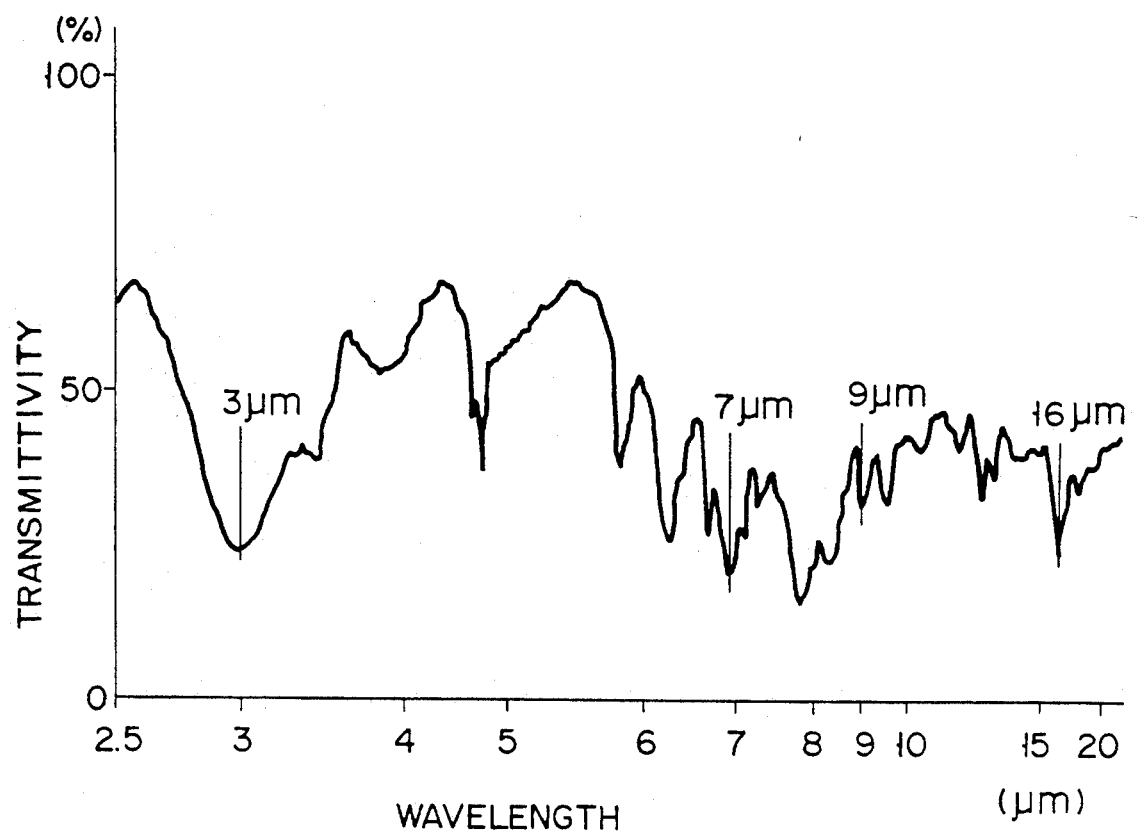
F I G. 3

INDIRECT TEMPERATURE-MEASUREMENT OF FILMS FORMED ON SEMICONDUCTOR WAFERS

This application is a continuation of application Ser. No. 07/497,534, filed on Mar. 22, 1990, now abandoned.

BACKGROUND OF THE INVENTION

1. Field of the Invention

The present invention relates to a method of measuring temperatures of matters.

2. Description of the Related Art

One of the conventional temperature measuring methods measures the temperature of matter by keeping a temperature sensor, such as a thermometer or a thermocouple contacted with the matter in question. Another way to measure the temperature is by infrared rays radiated from the matter and the temperature of the matter is calculated on the basis of the amount of infrared rays measured.

The method of measuring the temperature of the matter on the basis of the amount of infrared rays radiated from the matter uses Planck's law of radiation. This method calculates the temperature of the matter using the following equation which expresses the relation between temperature T, emissive power E and emissivity $\epsilon$:

$$T = (E/\sigma_0 \epsilon)^{\frac{1}{4}} \qquad (1)$$

When the temperature of the matter is to be measured accurately, however, there is no means for accurately learning the value of emissive power E and the emissivity $\epsilon$. Therefore, presumable values $E'$ and $\epsilon'$ are used instead of $E$ and $\epsilon$ and temperature $T'$ is measured by the following equation:

$$T' = (E'/\sigma_0 \epsilon')^{\frac{1}{4}} \qquad (2)$$

The symbol $\sigma_0$ in both the equations (1) and (2) represent the Stefan-Boltzmann's constant ($4.88 \times 10^{-8}$ (kcal/m$^2$hK$^4$). According to this method, the temperature of the matter can be measured keeping the matter untouched.

According to the method, however, infrared rays radiated from for example a heating plate are mainly measured because of transmittivities factors of a silicon wafer and a photoresist applied thereto, which, for example, both have high relative to infrared rays. This causes the temperature of the heating plate to be measured. As the result, an accurate measurement of the temperatures of the silicon wafer and the photoresist cannot be made. In addition, this method makes it necessary to set an emissivity which cannot be learned accurately.

In the case of the method of measuring the temperature of the matter keeping a temperature sensor contacted with the matter, it is impossible to measure the temperature of that portion of the matter with which the temperature sensor is not in contact.

A baking device, for example, is intended to bake a photoresist coated on the top of a semiconductor wafer which is mounted on the heating plate. It is needed in this case that the temperature of the photoresist be detected and thereby controlled. When a temperature sensor is placed in contact with the photoresist, however, the film of the photoresist is damaged. This makes it necessary to use a method of embedding a temperature sensor such as the thermocouple into the heating plate and presuming the temperature of the photoresist based upon measurements from just that of the heating plate. According to his method, an accurate temperature measurement of the photoresist cannot be made.

SUMMARY OF THE INVENTION

An object of the present invention is therefore to provide a method capable of measuring the temperature of a matter accurately, in a non-contact fashion and without setting any emissivity.

This object of the present invention can be achieved by a temperature measuring method comprising obtaining the spectral characteristics line of absorbing electromagnetic waves inherent to a matter whose temperature is to be measured; obtaining those absorption peak wavelengths of the electromagnetic waves which correspond to two or more high points of electromagnetic wave absorption rate obtained from the spectral characteristics line; measuring amounts of the electromagnetic waves, which have the absorption peak wavelength, radiated from the temperature-measured matter; and calculating the temperature of the matter from values of the radiant amounts of the electromagnetic waves thus measured.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows the absorption spectral characteristics of another silicon wafer relative to infrared rays, in which photoresist film having a thickness of about 5 μm is formed on a silicon wafer.

DETAILED DESCRIPTION OF THE PREFERRED EMBODIMENT

Figure 1:
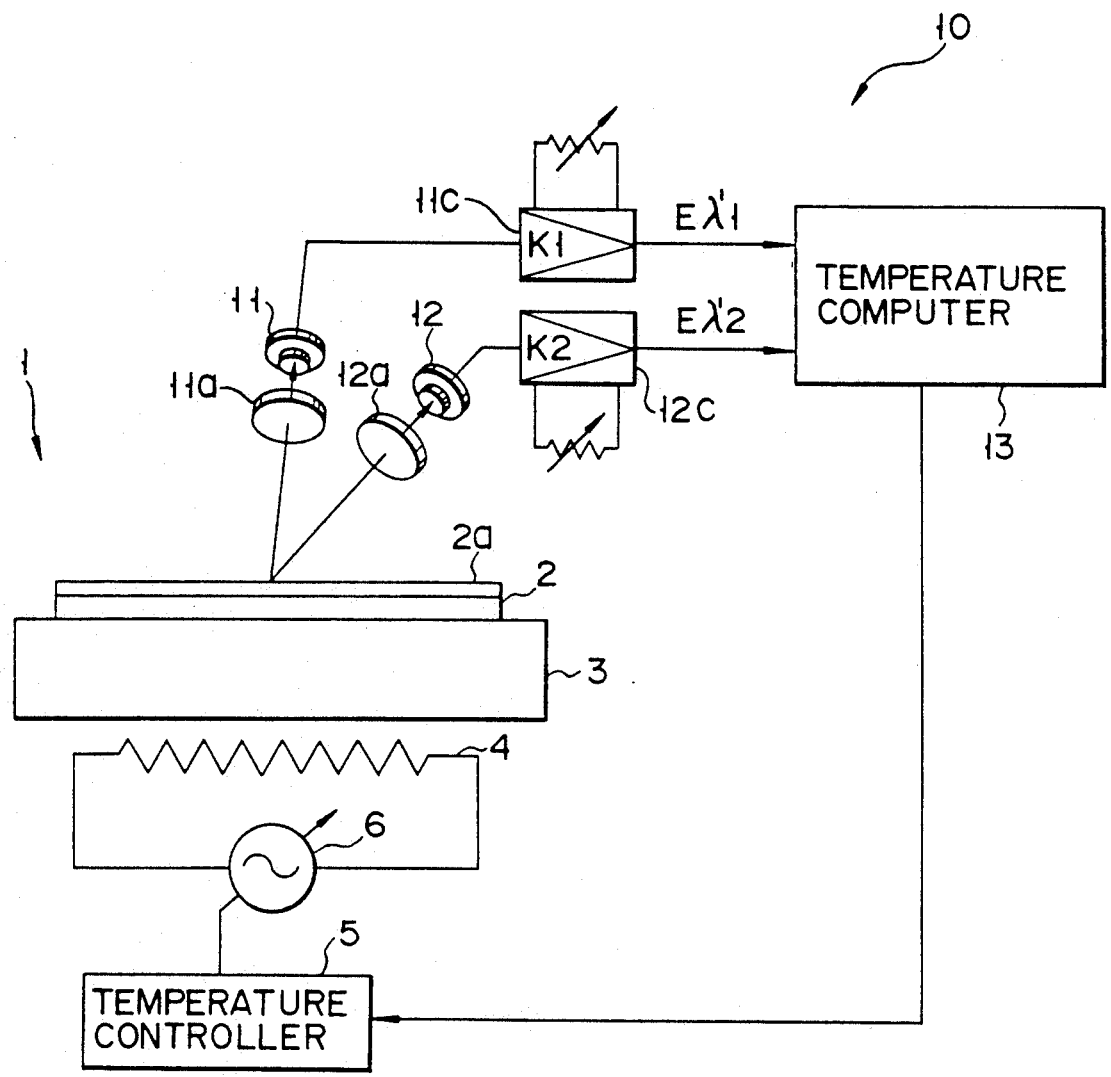
FIG. 1 is intended to explain the arrangement of a baking device used with an embodiment of the present invention.

Various other objects, features and attendant advantages of the present invention will be more fully appreciated as the same becomes better understood from the following detailed description when considered in connection with the accompanying drawings in which like reference characters designate like or corresponding parts throughout the several views and wherein:

A case where a method of the present invention is applied to measure the temperatures of semiconductor wafers at the baking process will be described with reference to the drawings.

A development step is used during the manufacturing of an integrated circuit, and in particularly semiconductor devices. A coating step is employed to coat a resist on the surface of the semiconductor wafer before the development step is also used. In this step, it is important to coat the liquid resist uniformly. A baking step is used for eliminating solvents which are part of the resist solution. The temperature of this eliminating step influences the final integrated circuit.

FIG. 1 is intended to explain the arrangement of a baking device 1. The baking device 1 is provided with a heating plate 3 on which a semiconductor wafer 2 can be placed. The heating plate 3 is provided, as its heating means, with a resistance heater 4. A power source 6 is connected to the resistance heater 4 in such a way so that current is supplied to the resistance heater 4 which is controlled by way of the temperature controller 5. The plane of the heating plate 3 on which the semiconductor wafer 2 is to be placed is finished like a mirror. This spicular finishing is carried out by forming a thin metal film on the wafer-mounted plane of the heating plate 3 according to a sputtering manner, for example. The reason why the spicular finishing is applied to the heating plate 3 resides in that any temperature measurement will not be influenced by infrared rays emitted from the heating plate 3.

Even when infrared rays emitted are reduced by applying the spicular finishing to the wafer-mounted plane of the heating plate 3, the efficiency heating the semiconductor wafer 2 is only slightly reduced. This is why the transmittivity of infrared rays through the semiconductor wafer 2 is high. In addition, the semiconductor wafer 2 is heated not by radiation but mainly by heat conduction.

The baking device 1 has a temperature measuring device 10. The temperature measuring device 10 includes a photoresist $2a$ attached to the top of the semiconductor wafer 2 which is mounted on the top of the heating plate 3, or two infrared rays detectors 11 and 12 designed to enable the detection of electromagnetic waves such as infrared rays radiated from the semiconductor wafer 2 itself. The infrared rays detectors 11 and 12 have filters $11a$ and $12a$, respectively, which allow infrared rays having different wavelengths ($\lambda_1$ and $\lambda_2$) to be selectively passed therethrough. Outputs of the infrared rays detectors 11 and 12 are applied to a temperature computer 13 through amplifiers $11c$ and $12c$. The amplifiers $11c$ and $12c$ are designed to control gains $K_1$ and $K_2$.

The result of temperature calculated by the temperature computer 13 of the temperature measuring device 10 is fed back to the temperature controller 5. The output of the power source 6 can be adjusted by the temperature controller 5 responsive to this temperature result applied. In short, current supplied to the resistance heater 4 can be so adjusted as to heat the semiconductor wafer 2 or photoresist $2a$ to a predetermined temperature.

The temperature of the photoresist $2a$ or semiconductor wafer 2 is measured as follows by the temperature measuring device 10 which is arranged, as described above, in relation to the baking device 1.

As well known, the monochromatic emissive power of electromagnetic waves (mainly infrared rays) radiated from a black body can be expressed as an equation (3) according to the Planck's law as follows:

$$E_{b\lambda} = C_1 \cdot \lambda^{-5}/[\exp(C_2/\lambda T) - 1] \quad (3)$$

wherein $\lambda$ represents wavelength (m), T is temperature in Kelvin, $C_1$ a constant equal to $3.217 \times 10^{-16}$ (Kcal.m²/h) and $C_2$ a constant equal to $1.4388 \times 10^{-2}$ (m.K).

When the presumed values $E_{\lambda 1}'$ and $E_{\lambda 2}'$ of monochromatic emissive power of infrared rays having wavelengths $\lambda_1$ and $\lambda_2$ are expressed according to the Planck's law and representing efficiencies of the light receiving elements 11 and 12 by $\eta_1$ and $\eta_2$.

$$E_{\lambda 1}' = \epsilon_{\lambda 1} \cdot K_1 \cdot \eta_1 \cdot C_1 \cdot \lambda_1^{-5}/ \quad (4)$$
$$[\exp(C_2/\lambda_1 T) - 1]$$
$$= \epsilon_{\lambda 1} \cdot K_1 \cdot f(\lambda_1, T)$$

$$E_{\lambda 2}' = \epsilon_{\lambda 2} \cdot K_2 \cdot \eta_2 \cdot C_1 \cdot \lambda_2^{-5}/ \quad (5)$$
$$[\exp(C_2/\lambda_2 T) - 1]$$
$$= \epsilon_{\lambda 2} \cdot K_2 \cdot f(\lambda_2, T)$$

The gains $K_1$ and $K_2$ of the amplifiers $11c$ and $12c$ are so corrected as to make $\epsilon_{\lambda 1} \cdot K_1 \cdot \eta_1 = \epsilon_{\lambda 2} \cdot K_2 \cdot \eta_2$, $$E_{\lambda 1}'/E_{\lambda 2}' = f(\lambda_1, T)/f(\lambda_2, T) \quad (6)$$

The temperature computer 13 calculates the temperature T from the equation (6), carrying out numerical analysis for example using the Newton-Raphson formula or any other conventional formula for solving two or more simultaneous equations.

The correction gains of $K_1$ and $K_2$ can be easily carried out as follows. Light receiving elements are selected in such a way that their efficiencies $\eta_1$ and $\eta_2$ become equal to each other with accuracy high enough in the range of wavelengths of radiations radiated from a matter whose temperature is to be measured. Monochromatic emissivities $E_{\lambda 1}$ and $E_{\lambda 2}$ of these radiations having wavelengths $\lambda_1$ and $\lambda_2$ are then calculated from previously-measured absorption spectra of the matter. The rate of gains $K_1$ and $K_2$ is set as follows using these $\epsilon_{\lambda 1}$ and $\epsilon_{\lambda 2}$.

$$K_1/K_2 = \epsilon_{\lambda 2}/\epsilon_{\lambda 1} \quad (7)$$

The rate of $K_1$ and $K_2$ is determined in this case only by the optical property of the matter, regardless of what type light receiving elements are and this is a significant advantage of the invention.

In a case where both of the efficiencies $\eta_1$ and $\eta_2$ are already known, their rate may be set as follows:

$$K_1/K_2 = \epsilon_{\lambda 2} \eta_2 / \epsilon_{\lambda 1} \eta_1 \quad (8)$$

According to Kirchoff's law, at thermal equilibrium the emissivity and absorptivity of a matter is the same. The same thing can be said about the black body. When the emissive powers of various matters are represented by $E_1, E_2, —, E_n$, their absorptivities by $\phi_1, \phi_2, —, \phi_n$, the emissive power of a black body by E and its absorptivity by $\phi$, the following is true:

$$E_1/\phi_1 = E_2/\phi_2 = — = E/\phi = E \quad (9)$$

When equation (9) is modified, $$E_1/E = \phi_1, E_2/E = \phi_2, —, E_n/E = \phi_n \quad (10)$$

wherein $E_n/E = \epsilon_n$ (emissivity). Therefore, $$\epsilon_1 = \phi_1, \epsilon_2 = \phi_2, —, \epsilon_n = \phi_n$$

This teaches us that the emissivity of a matter is equal to the absorptivity. In other words, a highly accurate temperature measurement can be realized without any influence by the infrared rays radiated from the background of the matter whose temperature is to be measured, when those infrared rays which have such wavelengths that are highly radiated or absorbed by the temperature-measured matter are measured.

Figure 2:
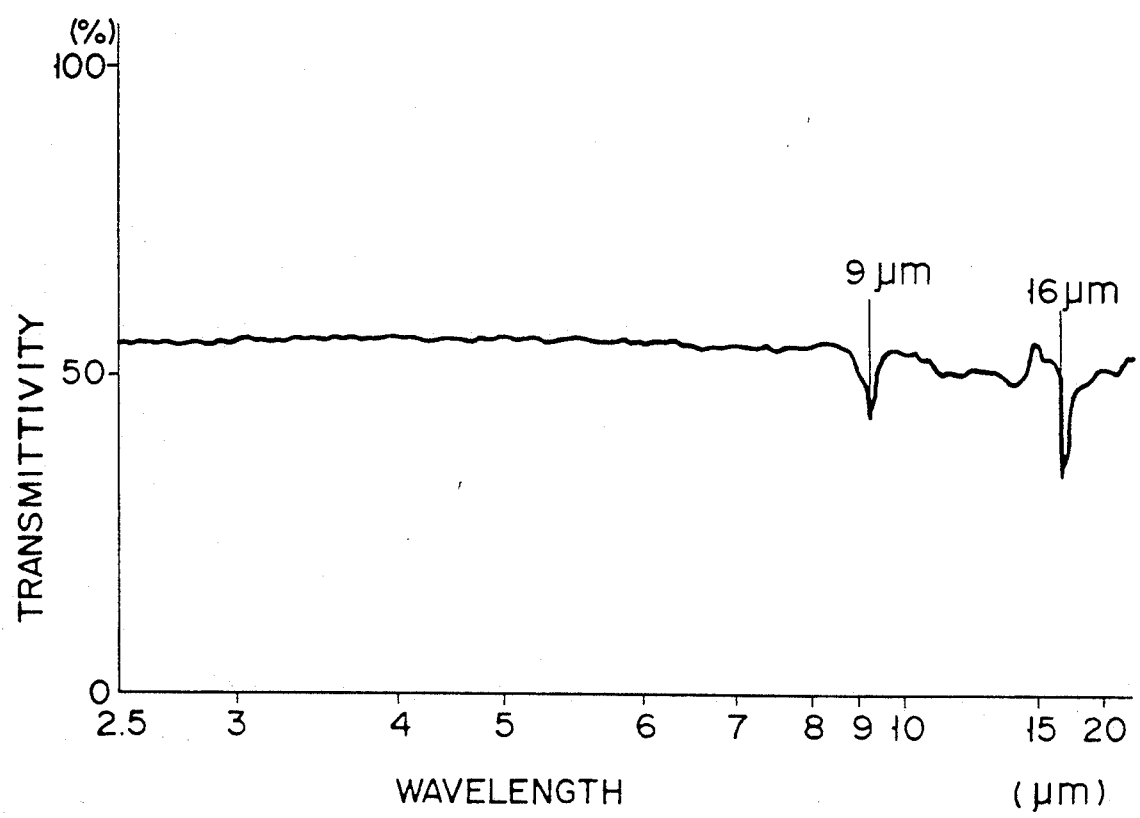
FIG. 2 shows the absorption spectral characteristics of a silicon wafer relative to infrared rays (Note: Absorptivity is complementary to transmittivity)

FIGS. 2 and 3 show absorption spectral characteristics of silicon wafers relative to infrared rays when transmittivity are plotted on the axis of ordinates and wavelengths on the axis of abscissas, however the silicon wafer in FIG. 3 is different from the one in FIG. 2 in that there is a photoresist film having a thickness of about 5 μm is formed on the former. As apparent from the graph in FIG. 2, the silicon wafer has absorption peaks at those positions where wavelengths are about 9 and 16 μm. As shown in FIG. 3, the photoresist film has some absorption peaks at those positions where wavelengths are about 3 and 7 μm although these positions are different depending upon what kind of photoresist is used.

In the case of this embodiment, therefore, the temperature of the semiconductor wafer (or silicon wafer) 2 is measured by setting $\lambda_1$ and $\lambda_2$ at those positions where the wavelengths are 9 and 16 μm respectively. The temperature of the photoresist 2a is measured by setting $\lambda_1$ and $\lambda_2$ at the wavelengths of 3 and 7 μm respectively.

It is needed that a correction of the gains $K_1$ and $K_2$ of the amplifiers 11c and 12c be carried out in each of those cases where the temperature of the semiconductor wafer 2 is to be measured and where that of the photoresist 2a is to be measured.

Radiant amounts of infrared rays having two kinds of wavelengths $\lambda_1$ and $\lambda_2$ which correspond to the absorption peaks of the semiconductor wafer 2 or photoresist 2a are measured in the case of this embodiment by the infrared rays detectors 11 and 12 which are provided with the filters 11a and 12a. The temperature of the semiconductor wafer 2 or photoresist 2a is calculated from values thus measured by the temperature computer 13. In other words, the temperatures of the semiconductor wafer 2 and photoresist 2a can be measured accurately and in non-contact fashion by measuring the radiant amounts of infrared rays which have such wavelengths that are at the radiation peaks of the semiconductor wafer 2 and photoresist 2a. It is not needed in this case that the emissivities are set, as seen in the conventional cases.

Further, the amount of infrared rays radiated from the heating plate 3 into the infrared rays detectors 11 and 12 can be reduced because the specular finishing is applied to the top of the heating plate 3. As the result, the temperatures of the semiconductor wafer 2 and photoresist 2a can be measured with a higher accuracy.

Current supplied from the power source 6 to the resistance heater 4 can be thus controlled on the basis of the accurate temperature measurement of the photoresist 2a or semiconductor wafer 2. As the result, a better baking process can be carried out by keeping the photoresist 2a heated to a predetermined temperature.

Although the silicon wafer and the photoresist have been employed in the case of this embodiment as the matters whose temperatures are to be measured, the present invention can be used to measure temperatures of other matters. For example, liquid crystal device substrates, Printing Circuit Boards, Surface Mounted Device Boards, insulation films of polyimide and silicon group, insulation varnishes, ion-sensitive polyvinyl chloride film and epoxy, acryl and polyurethane resins each having absorption peaks at certain wavelengths of infrared rays can be measured by the present invention.

What is claimed is:

1. A method of determining a temperature of a film formed on a semiconductor wafer mounted on a heating plate, said method comprising the steps of:

filtering electromagnetic waves radiated from said film by means of a first filter substantially allowing only a first electromagnetic wave of said electromagnetic waves to pass through, said first electromagnetic wave having a specific wavelength selected to correspond to an electromagnetic wave absorption rate peak point appearing in first spectral characteristics of absorbing electromagnetic waves inherent to said film, and selected to be prevented from corresponding to an electromagnetic wave absorption rate peak point appearing in second spectral characteristics of absorbing electromagnetic waves inherent to said wafer, in order to decrease a background heat effect;

filtering electromagnetic waves radiated from said film by means of a second filter substantially allowing only a second electromagnetic wave of said electromagnetic waves to pass through, said second electromagnetic wave having a specific wavelength selected to correspond to another electromagnetic wave absorption rate peak point appearing in said first spectral characteristics, and selected to be prevented from corresponding to an electromagnetic wave absorption rate peak point appearing in said second spectral characteristics, in order to decrease a background heat-effect;

respectively detecting the first electromagnetic wave having passed through said first filter, and the second electromagnetic wave having passed through said second filter;

respectively measuring the first radiant amount of the detected first electromagnetic wave, and the second radiant amount of the detected second electromagnetic wave; and calculating the temperature of said film from the values of said first and second radiant amounts.

2. The method according to claim 1, wherein said method further comprises the steps of:

producing first and second electrical signals representing said first and second radiant amounts respectively;

inputting said first and second electrical signals into a computer so as to calculate the temperature of the object based on said first and second electrical signals.

3. The method according to claim 2, wherein Planck's law of radiation and the Newton-Raphson method are utilized in said step of calculating the temperature.

4. The method according to claim 2, wherein said electromagnetic waves are infrared rays.

5. The method according to claim 4, wherein said wafer is made of silicon, and said first and second electromagnetic waves are selected to be prevented from having a wavelength of about 9 μm or about 16 μm.

6. The method according to claim 5, wherein said film is a photoresist film, and said first and second electromagnetic waves have wavelengths of about 3 μm and about 7 μm, respectively.

7. A method of determining a temperature of a film formed on a semiconductor wafer mounted on a heating plate, said method comprising the steps of:

selecting first and second wavelengths corresponding to different electromagnetic wave absorption rate peak points which appear in the spectral characteristics of absorbing electromagnetic waves inherent to said film, said first and second wavelengths being selected to be prevented from corresponding to an electromagnetic wave absorption rate peak point appearing in spectral characteristics of absorbing electromagnetic waves inherent to said wafer;

filtering electromagnetic waves radiated from said film by means of a first filter substantially allowing only a first electromagnetic wave having the first wavelength to pass through;

filtering electromagnetic waves radiated from said film by means of a second filter substantially allowing only a second electromagnetic wave having the second wavelength to pass through;

respectively detecting the first electromagnetic wave having passed through the first filter, and the second electromagnetic wave having passed through the second filter;

respectively measuring the first radiant amount of the detected first electromagnetic wave and the second radiant amount of the detected second electromagnetic wave; and calculating the temperature of the film from the values of the first and second radiant amounts.

8. The method according to claim 7, wherein said wafer is made of silicon, and said first and second wavelengths are selected to be prevented from being about 9 μm or about 16 μm.

9. The method according to claim 8, wherein said film is a photoresist film, and said first and second wavelengths are about 3 μm and about 7 μm, respectively.

10. A method of determining a temperature of a film formed on a silicon wafer mounted on a heating plate, said method comprising the steps of:

selecting first and second wavelengths corresponding to different electromagnetic wave absorption rate peak points which appear in spectral characteristics of absorbing electromagnetic waves inherent to said film, said first and second wavelengths being selected to be prevented from being about 9 μm or about 16 μm;

filtering electromagnetic waves radiated from the film by means of a first filter substantially allowing only a first electromagnetic wave having the first wavelength to pass through;

filtering electromagnetic waves radiated from the film by means of a second filter substantially allowing only a second electromagnetic wave having the second wavelength to pass through;

respectively detecting the first electromagnetic wave having passed through the first filter, and the second electromagnetic wave having passed through the second filter;

respectively measuring the first radiant amount of the detected first electromagnetic wave, and the second radiant amount of the detected second electromagnetic wave; and calculating the temperature of the film from the values of the first and second radiant amounts.

11. The method according to claim 10, wherein said first and second wavelengths are selected within a range of from 2.5 to 20 μm.

12. The method according to claim 11, wherein said film is a photoresist film, and said first and second wavelengths are about 3 μm and about 7 [2m, respectively.

* * * * *